Patented Aug. 5, 1952

2,606,306

UNITED STATES PATENT OFFICE 2,606,306

TELEVISION SIZE-CONTROL CIRCUIT

Jack E. Bridges, Chicago, Ill., assignor to Zenith Radio Corporation, a corporation of Illinois Application November 7, 1950, Serial No. 194,518

7 Claims. (Cl. 315—27)

Figure 1:
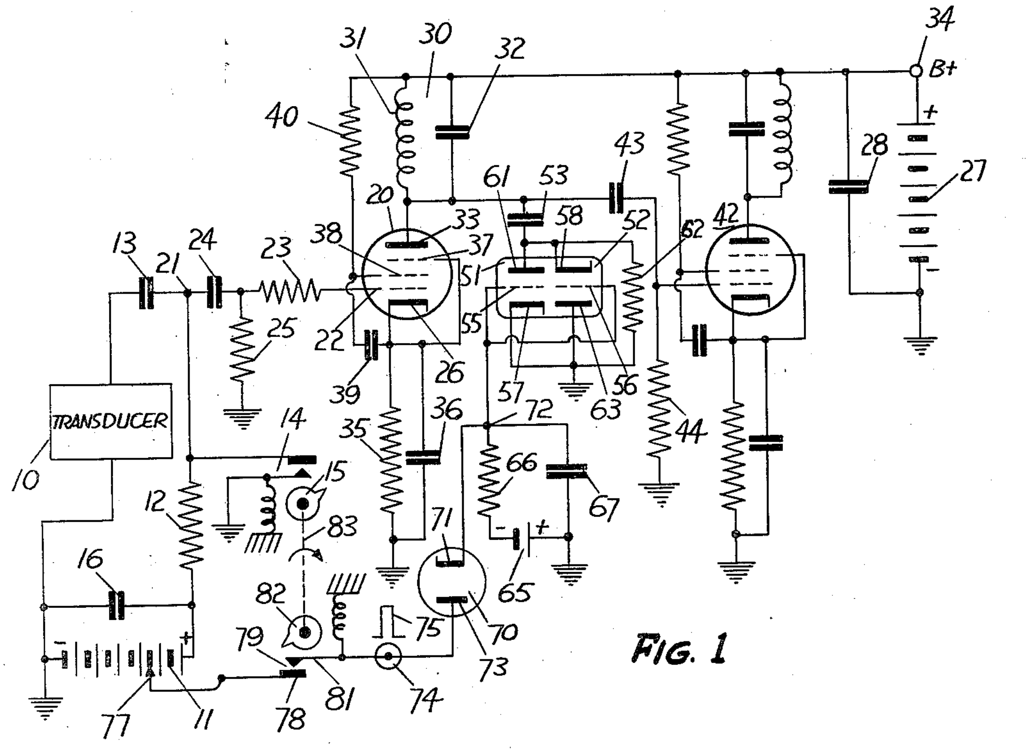
Figure 2:
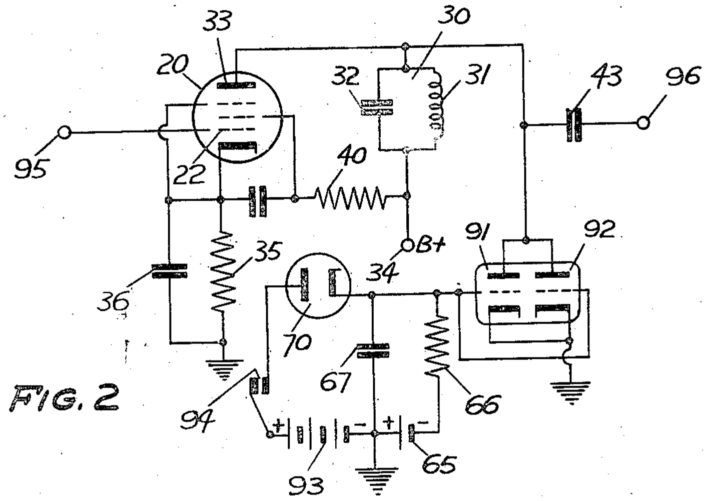
Figure 3:
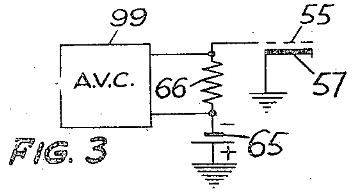

This invention relates to television receivers and the like, and more particularly to a new and improved size-control circuit for use in a television receiver.

In one conventional type of television receiver, received image signals representative of video information are utilized to provide intensity-control of the cathode-ray of an image-reproducing device. The cathode-ray is caused to scan the viewing screen of the image-reproducing device in accordance with a predetermined regular pattern by means of a pair of magnetic-deflection coils arranged to produce mutually perpendicular deflection fields and excited respectively by low-frequency (field-frequency) and high-frequency (line-frequency) scanning-signals. Conventionally, the field-frequency scanning-signal causes vertical deflection of the cathode-ray, while horizontal deflection is provided by the line-frequency scanning-signal.

In a commercial television receiver, it is desirable to provide an adjustable element for controlling the size of the reproduced image. One known arrangement, useful when the line-frequency scanning-signal generator provides a substantially constant-current scanning-signal, comprises a variable inductor connected in parallel with the line-frequency magnetic-deflection coil; adjustment of the size-control inductor then controls the portion of the constant-current scanning-signal which is diverted from the magnetic-deflection coil or yoke, thereby controlling the amplitude of the horizontal deflection. According to another known arrangement, when the line-frequency scanning-signal generator is of the type providing scanning-signals of substantially constant voltage, a variable inductor is connected in series with the yoke; adjustment of the size-control inductor then varies the voltage applied to the yoke, thereby providing an effective control of the amplitude of the horizontal deflection.

It is also well known in the art that undesirable velocity-modulation of the horizontal scan may be occasioned by unequal voltage division between the self-inductance of the two winding-sections comprising the yoke and between the distributed capacities thereacross. Such velocity-modulation may be attributed to the ringing currents which are induced in each of the two winding-sections constituting the yoke when the inductance-capacity products of the yoke winding-sections are unequal. In order to prevent ringing currents and undesirable velocity-modulation of the scan, it is known to provide a balancing capacity across one of the yoke winding-sections, of such a size as to render the effective inductance-capacity products substantially equal. However, if a variable size-control inductor is connected in series between the output winding of the sweep transformer and the yoke, this expedient effectively prevents ringing currents in the deflection coil only for a single setting of the size-control inductor; variation of the inductance in series with the yoke disturbs the balance between the inductance-capacity products.

It is a principal object of the present invention to provide a new and improved size-control circuit of the type comprising a variable size-control inductor connected in series with the yoke, for use in a television receiver or the like, in which ringing currents in the yoke are avoided for all settings of the size-control inductance.

In accordance with the invention, in a television receiver comprising a cathode-ray image-reproducing device and a magnetic-deflection coil including a pair of series-coupled winding-sections associated with the image-reproducing device and responsive to an applied scanning-signal for effecting periodic deflection of the cathode-ray, a variable inductor is connected in series between the two winding-sections for controlling the amplitude of the cathode-ray deflection.

Further in accordance with the invention, a balancing capacity is effectively coupled between a terminal of the magnetic-deflection coil and a point intermediate the terminals of the variable size-control inductor. Preferably the two winding-sections are of substantially equal self-inductance, and the balancing capacity is effectively coupled to the mid-point of the size-control inductor.

The features of the present invention which are believed to be novel are set forth with particularity in the appended claims. The invention, together with further objects and advantages thereof, may best be understood, however, by reference to the following description taken in connection with the accompanying drawing, in which the single figure is a schematic circuit diagram of a television receiver embodying a size-control circuit constructed in accordance with the present invention.

In the figure, composite television signals received by an antenna 10 are amplified by a radio-frequency amplifier 11 and converted in frequency by means of an oscillator-converter 12. The output signal from oscillator-converter 12 is appearing across the two winding-sections of the yoke are usually unequal, and it is conventional practice to connect a balancing condenser across one of the winding-sections to prevent the appearance of ringing currents in the yoke. When the size-control inductor is series-connected between the output secondary winding of the sweep transformer and one of the yoke terminals, as in the prior art, variation of the size control inductor disturbs the inductance-capacity balance between the two yoke winding-sections so that ringing currents are only eliminated for one adjustment of the size-control. In accordance with the invention, the size-control inductor is series-connected between the yoke winding-sections 46 and 47, and the balancing capacitor 51 is effectively connected between the high-potential terminal 52 of magnetic-deflection coil 27 and a point intermediate the terminals of size-control inductor 49. In the illustrated embodiment, the effective coupling of the balancing capacity 51 to an intermediate point on size-control inductor 49 is accomplished by connecting the balancing capacity to tap 53 on damping resistor 50 connected in parallel with inductor 49. If the self-inductances of the two winding sections 46 and 47 are substantially equal, as in the usual and preferred case, tap 53 is a center tap. Variation of the inductance of size-control 49, to control the amplitude of the horizontal deflection of the cathode-ray of image-reproducing device 16, affects the inductance-capacity products of the two winding-sections equally, so that ringing currents in the yoke are substantially precluded for all settings of the size-control inductor.

It is apparent that the size-control circuit of the present invention may be used in conjunction with sweep-signal generators other than that shown in the illustrated embodiment. However, the circuit of the invention is particularly advantageous in connection with a sweep-signal generator of the type employing a bidirectional electronic switch; such circuits do not employ a damper diode across the yoke so that ringing in the yoke must be carefully prevented by other means.

While a particular embodiment of the present invention has been shown and described, it is apparent that various changes of modifications may be made, and it is therefore contemplated in the appended claims to cover all such changes and modifications as fall within the true spirit and scope of the invention.

I claim:

1. In a television receiver: a cathode-ray image-reproducing device; a magnetic-deflection coil comprising a pair of series-coupled winding-sections associated with said image-reproducing device and responsive to an applied scanning-signal for effecting periodic deflection of the cathode-ray of said device; and a variable inductor directly connected in series between said winding-sections for controlling the amplitude of said deflection.

2. In a television receiver: a cathode-ray image-reproducing device; a magnetic-deflection coil comprising a pair of series-coupled winding-sections associated with said image-reproducing device and responsive to an applied scanning-signal for effecting periodic deflection of the cathode-ray of said device; a variable inductor directly connected in series between said winding-sections for controlling the amplitude of said deflection; and a balancing capacity effectively coupled between a terminal of said magnetic-deflection coil and a point intermediate the terminals of said variable inductor.

3. In a television receiver: a cathode-ray image-reproducing device; a magnetic-deflection coil comprising a pair of series-coupled winding-sections of substantially equal self-inductance associated with said image-reproducing device and responsive to an applied scanning-signal for effecting periodic deflection of the cathode-ray of said device; a variable inductor directly connected in series between said winding-sections for controlling the amplitude of said deflection; and a balancing capacity effectively coupled between a terminal of said magnetic-deflection coil and the mid-point of said variable inductor.

4. In a television receiver: a cathode-ray image-reproducing device; a magnetic-deflection coil comprising a pair of series-coupled winding-sections of substantially equal self-inductance associated with said image-reproducing device and responsive to an applied scanning-signal for effecting periodic deflection of the cathode-ray of said device; a variable inductor directly connected in series between said winding-sections for controlling the amplitude of said deflection; a damping resistor connected in parallel with said variable inductor; and a balancing capacity effectively coupled between a terminal of said magnetic-deflection coil and a point intermediate the terminals of said variable inductor.

5. In a television receiver: a cathode-ray image-reproducing device; a magnetic-deflection coil comprising a pair of series-coupled winding-sections associated with said image-reproducing device and responsive to an applied scanning-signal for effecting periodic deflection of the cathode-ray of said device; a variable inductor directly connected in series between said winding-sections for controlling the amplitude of said deflection; a damping resistor connected in parallel with said variable inductor; and a balancing capacitor connected between a terminal of said magnetic-deflection coil and a point intermediate the terminals of said resistor.

6. In a television receiver: a cathode-ray image-reproducing device; a magnetic-deflection coil comprising a pair of series-coupled winding-sections of substantially equal self-inductance associated with said image-reproducing device and responsive to an applied scanning-signal for effecting periodic deflection of the cathode-ray of said device; a variable inductor directly connected in series between said winding-sections for controlling the amplitude of said deflection; a damping resistor connected in parallel with said variable inductor; and a balancing capacitor connected between a terminal of said magnetic-deflection coil and the mid-point of said resistor.

7. In a television receiver: a cathode-ray image-reproducing device; a magnetic-deflection coil comprising a pair of series-coupled winding-sections of substantially equal self-inductance associated with said image-reproducing device and responsive to an applied scanning-signal for effecting periodic deflection of the cathode-ray of said device; a variable inductor directly connected in series between said winding-sections for controlling the amplitude of said deflection; means connecting one terminal of said magnetic-deflection coil to a point of constant reference potential; a damping resistor connected in parallel with said variable inductor and provided with a center tap; and a balancing capacitor connected between the other terminal of said magnetic-deflection coil and said center tap.

JACK E. BRIDGES.

REFERENCES CITED

The following references are of record in the file of this patent:

UNITED STATES PATENTS

| Number | Name | Date |
|---|---|---|
| 2,098,390 | Iams | Nov. 9, 1937 |
| 2,438,359 | Clapp | Mar. 23, 1943 |
| 2,440,786 | Schade | May 4, 1948 |
| 2,443,030 | Foster | June 8, 1948 |
| 2,449,969 | Wright | Sept. 28, 1948 |
| 2,510,670 | Trott | June 6, 1950 |
| 2,536,838 | Clark | Jan. 2, 1951 |
| 2,536,839 | Clark et al. | Jan. 2, 1951 |
| 2,536,857 | Schade | Jan. 2, 1951 |
| 2,543,305 | Schwarz | Feb. 27, 1951 |
| 2,543,719 | Clark | Feb. 27, 1951 |
| 2,553,360 | Court | May 15, 1951 |
| 2,555,828 | Barco | June 5, 1951 |
| 2,555,829 | Barco | June 5, 1951 |

Aug. 5, 1952 T. J. BOLAND 2,606,316

ELECTRONIC AMPLIFIER CIRCUITS

Filed Nov. 5, 1948

INVENTOR
THOMAS J. BOLAND
BY Elmer J. Gorn
ATTORNEY